(12) United States Patent
Landolt

(10) Patent No.: US 6,959,642 B1
(45) Date of Patent: Nov. 1, 2005

(54) DEVICE FOR PORTIONED DELIVERY OF MILK, PARTICULARLY FOR CAPPUCCINO MACHINES

(75) Inventor: Markus Landolt, Zurich (CH)

(73) Assignee: EGRO AG, Niederrohrdorf (CH)

( * ) Notice: Subject to any disclaimer, the term of this patent is extended or adjusted under 35 U.S.C. 154(b) by 0 days.

(21) Appl. No.: 10/819,713

(22) Filed: Apr. 7, 2004

(51) Int. Cl.[7] .................. A47J 31/40; A47J 31/44; A47J 31/46; A23C 9/00; A23L 2/26

(52) U.S. Cl. .................. 99/455; 99/290; 99/293; 99/323.1; 99/452

(58) Field of Search .................. 99/452–455, 516, 99/483, 293, 323.1, 280–286, 279; 261/DIG. 16, 261/DIG. 76, 62, 79.2; 426/231–233, 511, 426/590, 506, 433, 519

(56) References Cited

U.S. PATENT DOCUMENTS 5,498,757 A * 3/1996 Johnson et al. ............. 426/520
5,611,262 A * 3/1997 Rizzuto et al. ............. 99/294
6,099,878 A * 8/2000 Arksey ........................ 426/231

FOREIGN PATENT DOCUMENTS

DE  199 55 195  5/2001

* cited by examiner

*Primary Examiner*—Timothy F. Simone
(74) *Attorney, Agent, or Firm*—Weingarten, Schurgin, Gagnebin & Lebovici LLP

(57) ABSTRACT

A delivery head for delivering a milk portion is connected via a connection line to a milk container in a refrigerator. A rinsing agent source is connected via a first line to a connection part in the connection line. A first on-off valve is inserted in the first line. The connection part is also connected via a second line and a second valve to a fresh air source. The container, the valves, and the connection part are installed in a refrigerator. Through this implementation, complete emptying of the connection line and the delivery head of rinse water after the rinsing procedure, as well as efficient rinsing during the rinsing procedure, are achieved.

11 Claims, 1 Drawing Sheet

DEVICE FOR PORTIONED DELIVERY OF MILK, PARTICULARLY FOR CAPPUCCINO MACHINES

BACKGROUND OF THE INVENTION

The present invention relates to a device for portioned delivery of milk, particularly for cappuccino machines. Such a device is known from DE-OS 199 55 195 A1. This known device has a delivery head in the form of a milk mixing chamber, to which steam is supplied via a first valve, air is supplied via a second valve, and milk is supplied from a milk container via a pump and a double check valve. The milk container, the pump, and the check valve are positioned in a refrigerator. For cleaning the device, the steam supply line to the mixing chamber is connected via a further line to the double check valve. The steam supply line may also have cold water applied to it via a further valve.

However, during the delivery of hot milk, steam may reach the cold region of the connection line via the double check valve and heat the milk in this region, which impairs its storability. The main part of the rinse water reaches the mixing chamber directly via the steam line, and the proportion of the rinse water which reaches the connection line is uncertain. In addition, multiple blank portions must be delivered after rinsing before the milk flows undiluted to the mixing chamber again.

SUMMARY OF THE INVENTION

The present invention is based on the object of correcting these disadvantages. This object is in a device having a milk container, a delivery head for delivering a milk portion into a drinking vessel, a connection line between the milk container and the delivery head, a rinsing agent source, a first line between the rinsing agent source and a connection part on the connection line, and a controlled switchable first valve in this first line, the milk container and the connection part being positioned in a refrigerator, and characterized in that the connection part is also connected via a second valve and a second line to an air source, and the first valve is connected exclusively to the connection part via the first line.

Because the connection part is connected via a second valve to an air source, the connection line and the delivery head may be completely emptied after the rinse procedure. Upon returning to operation, the delivery of blank portions of diluted milk may therefore be dispensed with. Because the first valve is connected on the outlet side only to the connection line, reliable and efficient rinsing of this connection line is achieved. Heating of the milk in the connection line inside the refrigerator is prevented.

The refinement according of having the first and second valves in the refrigerator has the advantage that the lines between the valves and the connection part on the connection lines may be kept short and hardly come into contact with milk.

The refinement of having a pump for an air source is advantageous above all if the refrigerator is positioned significantly below the delivery head.

The refinement of having a third valve positioned in the first line neighboring the rinsing agent source, outside the refrigerator is advantageous above all if the refrigerator is positioned spatially separated from the coffee machine and the rinsing agent, e.g., water, is also used for other purposes inside the machine, e.g., feeding a steam boiler.

By having a milk pump positioned upstream from the connection part is also used to overcome height differences and results in a more consistent foam if the delivery head is implemented as a milk foamer. In addition, it is used for portioning the milk.

By having two delivery heads, each of which is connected via a connection line and a milk pump to the milk container, with each of the connection lines having a connection part to each first line, each having a first valve and a second valve, if there is a double arrangement of delivery heads, no communication may occur between the two connection lines.

The water pump in which the rinsing agent source is a fresh water pump is expedient in order to ensure sufficient pressure of the water independently of the fresh water line pressure.

The features of each delivery head being also connected via a fourth valve to a steam source for heating the milk portion and/or each delivery head being also connected via a fifth valve to the atmosphere or a pressurized air source for foaming the milk portion refine the delivery head for heating and foaming the milk.

DESCRIPTION OF THE DRAWING

The invention will be more fully understood with reference to the following Detailed Description of the Invention in conjunction with the drawings of which.

DETAILED DESCRIPTION OF THE INVENTION

Figure 1:
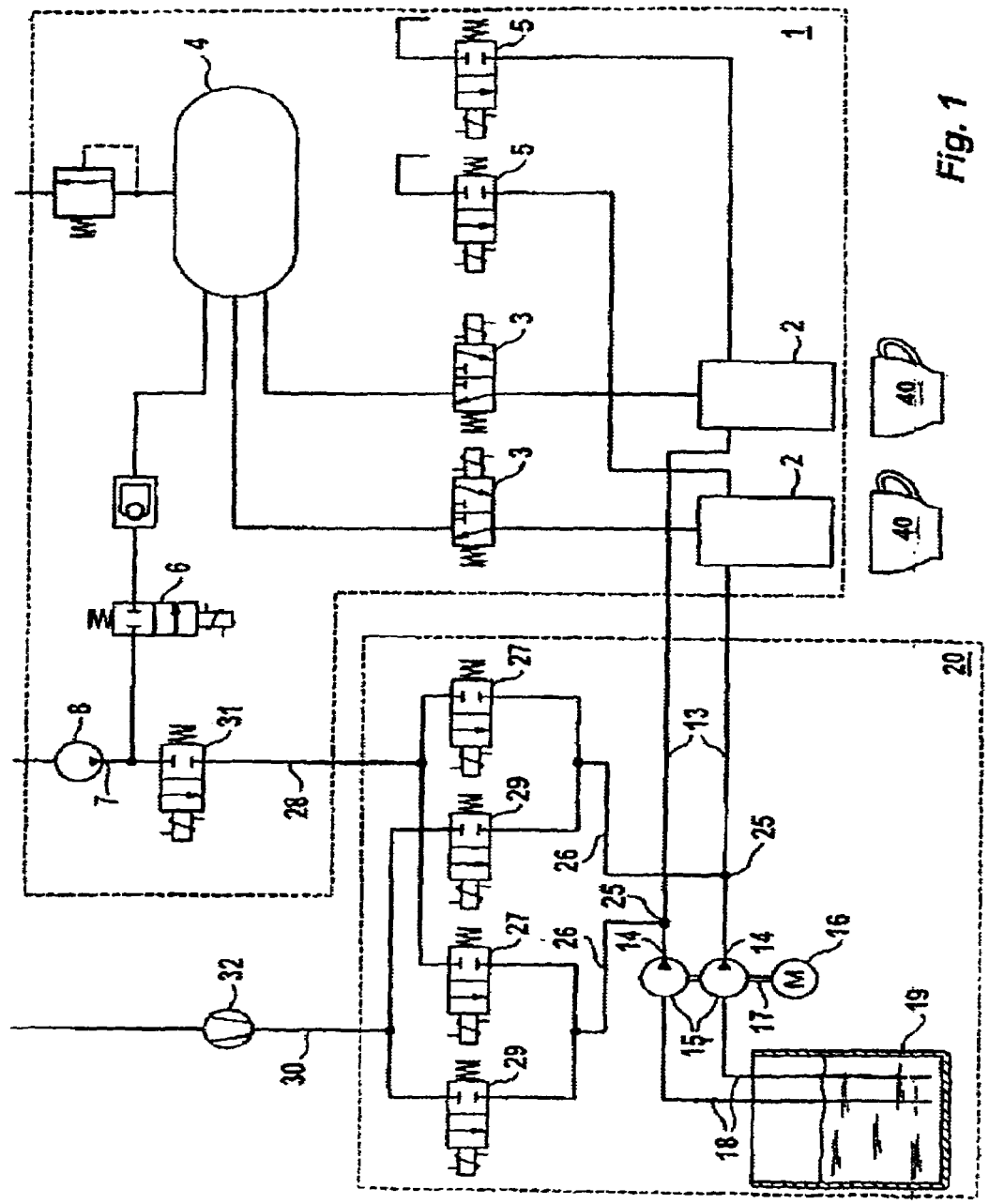
FIG. 1 is a diagram of an illustrative embodiment of a milk foaming device for cappuccino machines, in accordance with the present invention.

In the following, an exemplary embodiment of the present invention is described on the basis of the drawing. The single FIG. 1 shows a circuit diagram of a milk foaming device for cappuccino machines.

Two foamer heads 2 or delivery heads are positioned in a coffee machine 1 for delivering a milk portion into respective drinking vessels 40. Each head 2 is connected via an on-off valve 3 to a steam boiler 4 and via a second on-off valve 5 to the atmosphere. A level switch (not shown) in the boiler 4 regulates the fresh water supply to the boiler 4 from the outlet 7 of a water pump 8 or rinsing agent source via a further on-off valve 6.

Each foamer head 2 is also connected via a connection line 13 to the outlet 14 of a volumetric milk pump 15. The two pumps 15 are driven by a shared motor 16, whose driven shaft 17 rotates around a predetermined angle of rotation to deliver a milk portion. The lines 18 to the suction side of the pumps 15 are dipped into a milk container 19. The container 19, the pumps 15, the lines 18, and a part of the lines 13 are installed in a refrigerator 20.

The refrigerator 20 may be placed spatially separated from the coffee machine 1.

Each line 13 is connected via a connection part 25 to a rinse line 26. Each line 26 is connected via a valve 27 to a fresh water supply line 28 and via a further valve 29 to an air supply line 30. The valves 27, 29 are installed inside the refrigerator 20 neighboring the connection part 25, so that the rinse lines 26 are short. The line 28 is connected via a further valve 31, positioned in the coffee machine 1, to the outlet 7 of the water pump 8. In this way, the line 28 is unpressurized in normal operation. The line 30 may be connected directly to the atmosphere via an air filter (not shown), particularly if the foamer heads 2 generate a sufficient partial vacuum in the lines 13 when the valves 3 are switched on, or it may be connected to an air pump 32.

For the periodic cleaning of the foamer heads 2 and the uncooled part of the lines 13, the valves 3, 27, and 31 and the pump 8 are switched on. After the rinsing, the valve 31 is switched off, then the valves 27 are switched off and the valves 29 are switched on. The lines 13 and the foamer heads 2 are emptied of rinse water through the air flowing in. Subsequently, the valves 3 and 29 are switched off again. Due to the emptying of the lines 13 and the foamer heads 2 after the rinsing, even the first complete milk portion is delivered practically undiluted.

LIST OF REFERENCE NUMBERS 1 coffee machine
2 foamer head
3 valve
4 boiler
5 valve
6 valve
7 outlet
8 pump
13 connection line
14 outlet
15 pump
16 motor
17 driven shaft
18 line
19 milk container
20 refrigerator
25 connection part
26 rinse line
27 valve
28 water supply line
29 valve
30 air supply line
31 valve
32 air pump

What is claimed is:

1. A device for portioned delivery of milk, comprising:
a milk container in a refrigerator;
at least one milk pump in the refrigerator, the milk pump having a suction side and a pressure side, wherein the milk pump is connected on its suction side to the milk container;
at least one connection line connecting the pressure side of the milk pump to at least one foaming device for delivering a milk portion into at least one drinking vessel;
a connection part in the connection line inside the refrigerator;
a switchable first valve in a first line between a rinsing agent source and the connection part; and
a switchable second valve in a second line between an air source and the connection part.

2. The device according to claim 1, wherein the first valve is positioned in the refrigerator.

3. The device according to claim 1, wherein the second valve is positioned in the refrigerator.

4. The device according to claim 1, wherein the air source is an air pump.

5. The device according to claim 1, wherein a third valve is positioned in the first line neighboring the rinsing agent source, outside the refrigerator.

6. The device according to claim 1, wherein the at least one milk pump comprises a plurality of milk pumps, wherein the at least one foaming device comprises a plurality of foaming devices, and wherein the at least one connection line comprises a plurality of connection lines, each foaming device being connected via a respective one of the connection lines and a respective one of the milk pumps to the milk container, and each connection line having a connection part to the first line and the second line.

7. The device according to claim 1, wherein the rinsing agent source is a fresh water pump.

8. The device according to claim 1, wherein the foaming device is connected via a fourth valve to a steam source for heating the milk portion.

9. The device according to claim 8, wherein the foaming device is connected via a fifth valve to the atmosphere or a pressurized air source for foaming the milk portion.

10. The device according to claim 2, wherein the second valve is positioned in the refrigerator.

11. The device according to claim 2, wherein:
the second valve is positioned in the refrigerator;
the air source is an air pump; and
a third valve is positioned in the first line neighboring the rinsing agent source, outside the refrigerator;
wherein the at least one milk pump comprises a plurality of milk pumps, wherein the at least one foaming device comprises a plurality of foaming devices, and wherein the at least one connection line comprises a plurality of connection lines, each foaming device being connected via a respective one of the connection lines and a respective one of the milk pumps to the milk container, and each connection line having a connection part to the first line and the second line; and wherein:
the rinsing agent source is a fresh water pump;
each foaming device is connected via a fourth valve to a steam source for heating the milk portion; and
each foaming device is connected via a fifth valve to the atmosphere or a pressurized air source for foaming the milk portion.

* * * * *